United States Patent
Bitzer et al.

(10) Patent No.: US 7,840,327 B2
(45) Date of Patent: Nov. 23, 2010

(54) DRIVE ASSISTANCE DEVICE FOR A WHEEL CHAIR AND A WHEEL CHAIR HAVING A DRIVE ASSISTANCE DEVICE

(75) Inventors: Paul-Gerhard Bitzer, Albstadt (DE); Bernhard Stumpp, Bisingen (DE)

(73) Assignee: Ulrich Alber GmbH, Albstadt-Tailfingen (DE)

( * ) Notice: Subject to any disclaimer, the term of this patent is extended or adjusted under 35 U.S.C. 154(b) by 0 days.

(21) Appl. No.: 12/512,260

(22) Filed: Jul. 30, 2009

(65) Prior Publication Data

US 2010/0036543 A1  Feb. 11, 2010

(30) Foreign Application Priority Data

Aug. 8, 2008  (DE) ..................... 10 2008 002 993

(51) Int. Cl.
*B62M 1/14*  (2006.01)

(52) U.S. Cl. ..................... 701/49; 280/250.1

(58) Field of Classification Search ............... 701/1; 280/250.1, 304.1, 242.1, 246, 255; 180/65.51
See application file for complete search history.

(56) References Cited

U.S. PATENT DOCUMENTS

| | | | |
|---|---|---|---|
| 7,316,298 B2* | 1/2008 | Yeager | 188/2 F |
| 7,434,824 B2* | 10/2008 | Connors et al. | 280/304.1 |
| 2004/0051272 A1* | 3/2004 | Wong | 280/244 |
| 2006/0096793 A1 | 5/2006 | Akagi | |

FOREIGN PATENT DOCUMENTS

| | | |
|---|---|---|
| EP | 0790049 A2 | 8/1997 |
| EP | 0832632 A2 | 4/1998 |
| EP | 0945113 A2 | 9/1999 |
| EP | 1911427 A1 | 4/2008 |
| JP | 11342159 A | 12/1999 |
| JP | 2000-152425 | 5/2000 |
| JP | 2006-116186 | 10/2004 |
| WO | 2007018034 | 2/2007 |

OTHER PUBLICATIONS

English Abstract of JP11342159.
English Abstract of EP0945113.
English Abstract of EP0790049.
English Abstract of EP0832632.

* cited by examiner

*Primary Examiner*—Dalena Tran
(74) *Attorney, Agent, or Firm*—Novak Druce + Quigg LLP

(57) ABSTRACT

A drive assistance device for a wheel chair having a drive motor, a driving wheel, a sensor means which is designed such that a driving force manually induced into a driving wheel is detected, and a control unit, designed such that the drive motor is controlled to drive the driving wheel in accordance with a drive assistance degree depending on the driving force manually induced into the driving wheel, wherein the control unit comprises an anti-rollback operational mode in which it is adapted to control the drive motor such that an unintended rolling of the driving wheel is avoided. The invention also relates to a wheel chair having such a drive assistance device.

15 Claims, 5 Drawing Sheets

DRIVE ASSISTANCE DEVICE FOR A WHEEL CHAIR AND A WHEEL CHAIR HAVING A DRIVE ASSISTANCE DEVICE

CROSS-REFERENCE TO RELATED APPLICATIONS

The present application claims priority to German Patent Application DE 10 2008 002 993.9 filed Aug. 8, 2008. Said application is hereby incorporated by reference in its entirety.

FIELD OF THE INVENTION

The present disclosure relates to a drive assistance device and a wheel chair having a drive assistance device.

BACKGROUND OF THE INVENTION

One example of a drive assistance device is presented in EP 0 945 113 A2. Such drive assistance device for a wheel chair comprises a drive motor, a driving wheel, a sensor means which is designed such that it is adapted to determine a driving force induced by hand into the driving wheel and a control unit which is designed such that the drive motor for driving the driving wheel is driven in accordance with a degree of drive assistance depending on the driving force which is induced into the driving wheel by hand.

Such wheel chairs provide the wheel chair driver with the option to drive the wheel chair manually, i.e. by hand, for instance via respective hand rims provided at the driving wheels. However, supporting this manual drive depends on respective need by one or more drive motors. In order to achieve this, the sensor means detects the respective force manually induced into the hand rim and the control unit controls the drive motor or the drive motors for driving the driving wheel in accordance with a degree of drive assistance depending on the force induced into the hand rim.

The drive systems are suited to take some of the physical strain from the wheel chair driver. The manual force induced by hand of the wheel chair driver into the driving wheel, for instance via a hand rim, results in producing torque. Additionally, an electric driving force or a corresponding driving torque of the drive motors is developed in accordance with a drive assistance to a degree depending on the manually induced force due to the control unit controlling the drive motor accordingly. These forces, the torque produced by manual operation and the torque produced from the electronic driving force or drive motors, together act as a driving force or driving torque, respectively. In this kind of operation there are therefore acting a manual driving force and the torque resulting therefrom and the torque of the driving motor in the same direction. Consequently, the magnitude of the resulting force is the combination of the manual force supplied by the driver and the force supplied by the electric motor.

As a result, a wheel chair driver provides only a part of the force necessary for locomotion and, therefore, can without major strain negotiate slopes uphill and downhill. The relation between the manually induced forces and the torques provided by the electric motor, that is the level or degree of drive assistance, can be adjustable in accordance with the specific personal needs or requirements of the wheel chair driver, and, as the case may be, can be selected in advance and preset.

When driving on a slope or ramp it is still necessary for a wheel chair driver in spite of the support of the motors to provide a higher power for locomotion than in case of driving on an even plane. Moreover, the driving speed is quite slow in such driving situations, for instance at slopes or ramps. Therefore, it may happen that in those phases where the wheel chair driver has to release the grip at the hand rim in order to reposition the hand for the next push, the wheel chair can lose so much speed that, in view of the downhill force, the wheel chair rolls back before the wheel chair driver can effect a subsequent pushing motion at the hand rim.

Moreover, it is possible that the wheel chair driver underestimates a slope and, therefore, ends up in a situation there he is no longer able to muster the required power at the hand rim in sufficient frequency in order to effect locomotion in the desired direction. As the case may be, he will be forced to make short stops between two pushing motions. This, however, involves the risk that, in view of the downhill force, the wheel chair unintendedly rolls back, contrary to the desired driving direction.

SUMMARY OF THE INVENTION

The object underlying exemplary embodiments disclosed herein is to provide a drive assistance device of the kind explained above as well as a wheel chair equipped with such drive assistance device which solves the problem as explained above in connection with the undesired reversal of the driving direction due to the downhill force.

The control unit of the drive assistance device in accordance with exemplary embodiments of the present disclosure comprises an anti-rollback operation mode. If the control unit operates in this anti-rollback operation mode, it can drive the drive motor such that an unintended rolling of the driving wheel is avoided.

It is possible to avoid unintended rolling of the driving wheel by corresponding layout of the control unit, by a respective design of the software under which the controls unit operates. In order to achieve this, there are processes employed, preferably utilizing respective signals and physical values, which are present or are used for operating the drive assistance device of the wheel chair. In case of a wheel chair, which generally has two larger driving wheels and two smaller, freely pivotable running wheels which are not driven, the two driving wheels operate with respect to the anti-rollback function independently from each other.

The drive assistance device according to exemplary embodiments of the present invention can avoid an unintended rolling away of the wheel chair without use of a mechanical brake.

In one advantageous embodiment of the present disclosure, a control unit is designed such that it operates alternatively in a regular operation mode, in which the prevention of an unintended rolling of the driving wheel is disabled, or in an anti-rollback operation mode in which the driving motor, if required, is driven such that an unintended rolling of the driving wheel is avoided.

The regular operation mode comprises preferably a torque control which causes the driving motor for driving the driving wheel to be driven in accordance with a driving force which is manually induced into the driving wheel, wherein the proportion between the manual driving force and the driving torque provided by the electric motor corresponds to the degree of drive assistance.

The anti-rollback operation mode comprises preferably a rotational frequency control which controls the rotational frequency of the driving wheel. In this case, the target value of zero for the rotational frequency of the driving wheel is preset in order to achieve halt, i.e. no rotation of the driving wheel.

In the anti-rollback operation mode, alternatively the torque control or the rotational frequency control can be employed.

This gives the option to adapt the control characteristics and regulation characteristics of the drive assistance device to specific operational situations in an advantageous manner. In accordance therewith, a change between torque control and rotational frequency control is preferably effected depending on operational parameters. In this respect, the rotational frequency of the driving wheel, the direction of rotation of the driving wheel, the magnitude of the driving force induced by hand at the driving wheel, the direction of the driving force induced by hand at the driving wheel, the amount of the torque resulting from the driving force induced by hand at the driving wheel and the torque provided by the drive motor in accordance with a drive assistance degree depending on the driving force induced by hand at the driving wheel, the effective torque provided by the drive motor and the value of a timer switch are used taken alone or together or in various combinations. If deemed necessary, and appropriate, other values or further considerations are taken into account and used, too.

The anti-rollback operation mode can be switched on or switched off by hand. It is possible that several drive assistance degree switches are provided with which different drive assistance levels that can be preselected. The anti-rollback operation mode can be switched on, switched off or switched on and switched off by means of one or every of said drive assistance degree switches and can also be switched on, switched off or switched on and off by one or several separate switches.

In additional embodiments of the invention, the control unit can be designed such that upon switching on it is always in the regular operation mode. Alternatively to that or in accordance with a corresponding preselection the control unit can be designed such that upon switching on it is in the same operational mode in which it had been before it had been switched off.

The drive assistance device according to several embodiments of the present invention can comprise a hand rim through which a force can be induced by hand into the driving wheel. The drive motor can be designed as an electric motor and, specifically, as a hub drive motor. Such a hub drive motor can be arranged in the hub of a driving wheel together with a rechargeable battery and the control unit.

BRIEF DESCRIPTION OF THE FIGURES

In the following, embodiments are further explained with reference to the accompanying figures, in which.

DETAILED DESCRIPTION OF EXEMPLARY EMBODIMENTS

Figure 1:
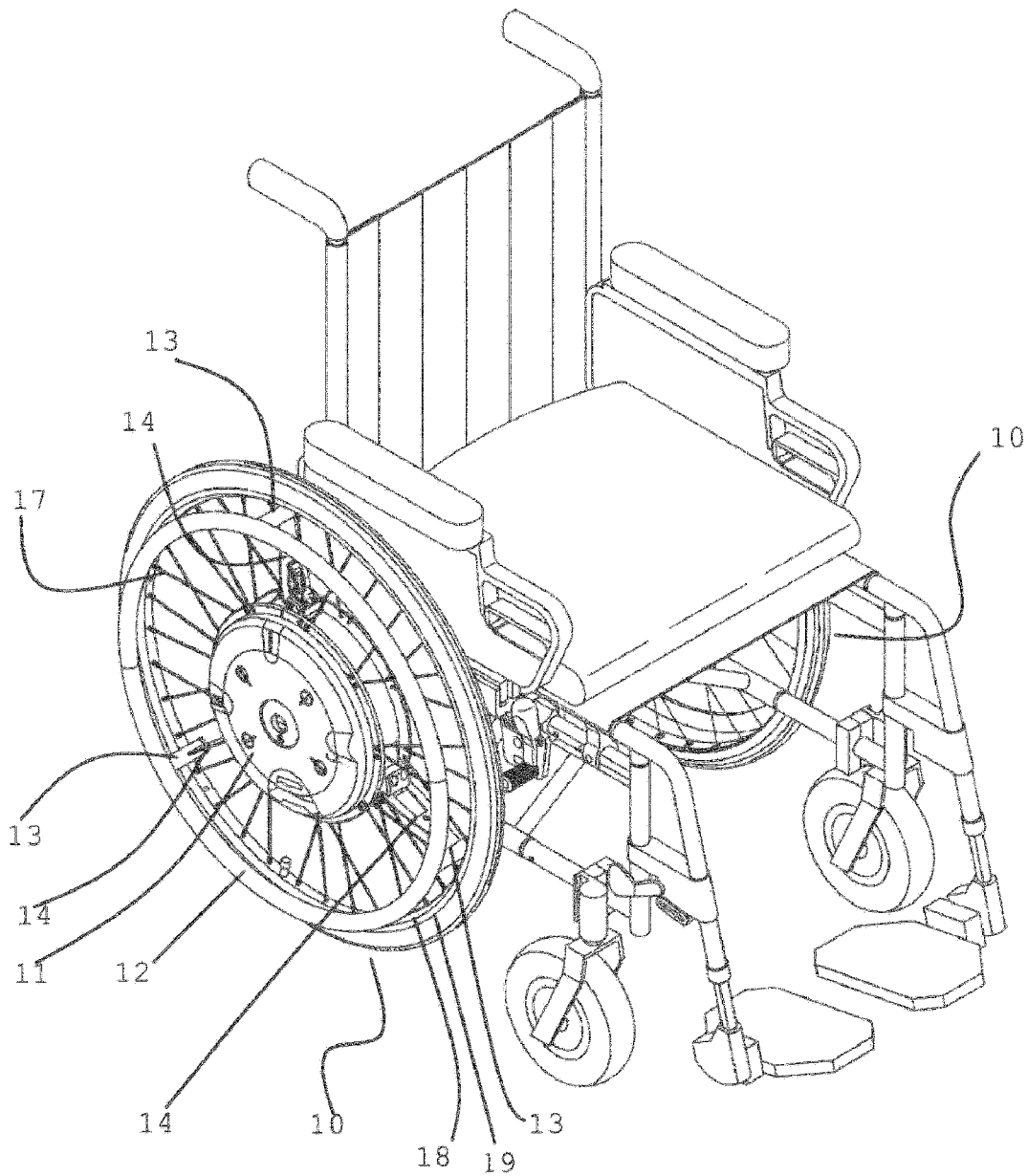
FIG. 1 is a wheel chair having a drive assistance device in accordance with an exemplary embodiment.

FIG. 1 shows a perspective view of a wheel chair having two driving wheels 10. Each driving wheel 10 comprises a hub 11 coupled via common spokes 17 with a wheel rim 18 on which a tire 19 is mounted. A drive motor, for example an electric motor (not shown), a rechargeable battery (not shown) and a control unit (not shown) are located within said hub 11.

A hand rim 12 is connected with said hub 11 via three struts 13 and three spoke elements 14.

If a manual force is induced into the hand rim 12, this is directly transferred to the hub 11 via the struts 13 and the spoke elements 14. A sensor means detects the affect of the force, which is effected on a spoke element 14. This affect is, at the one hand, a tension generated in the spoke element 14 and, on the other hand, a deformation or bending of the spoke element. At least one of these effects is detected and serves as a measure for the force induced at the hand rim 12. A control unit controls the drive motor to provide a torque in accordance with this measure. Here, variable assistance degrees or assistance degrees which are pre-programmed can be provided.

Suitable sensors are for instance disclosed in EP 0 945 113 A2.

The control unit is adapted to exert an anti-rollback-function (ARF) preferably by implementation of appropriate software. The anti-rollback function utilizes signals and physical values that are processed during operation of a wheel chair with a drive assistance device. The driving wheels according to the anti-rollback function operate independently from each other.

In a preferred embodiment, a control unit operates in a regular operation mode by using a torque control. That is the drive motor is controlled such that it provides a specific torque in accordance with a selected drive assistance degree or a drive assistance degree momentarily provided by other functions as well as the force manually induced into the hand rim 12.

In an anti-rollback operation mode which is alternatively available said control unit operates either in accordance with the torque control as explained above or it switches, if the need arises, to a rotational frequency control which controls the rotational frequency of the driving wheel wherein the target value of the rotational frequency of the driving wheel is zero, which leads to a halt of the driving wheel.

Figure 2:
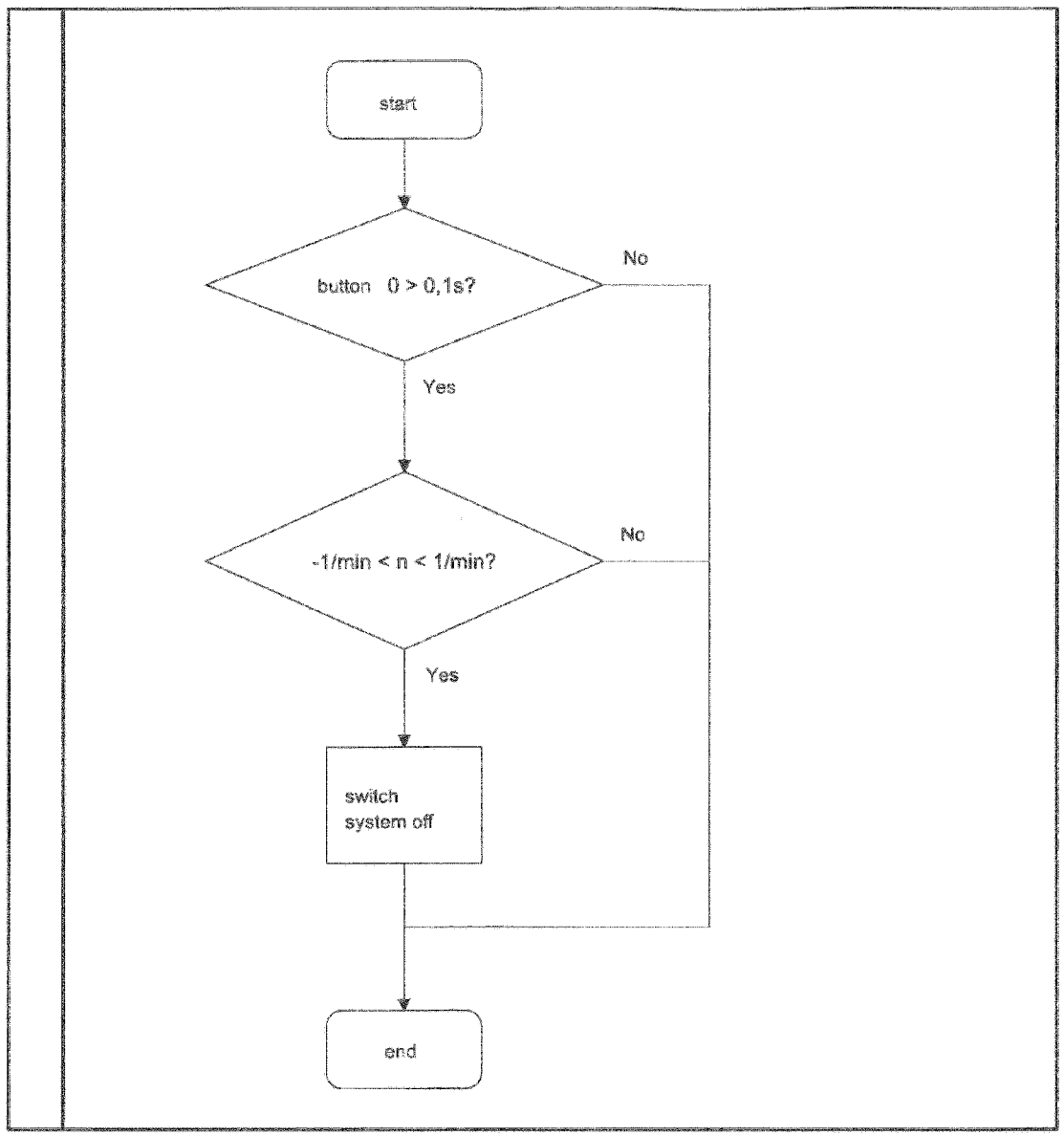
FIG. 2 is a first flow chart of the embodiment according to FIG. 1.

In the example described as follows, the switching off of the control unit along with the anti-rollback-function is described in connection with FIG. 2. If a cut-off switch which is indicated as button 0 in the flow chart according to FIG. 2 is pushed for longer than 0.1 seconds, a query is effected whether the rotational frequency of the driving wheel is larger than −1/min and smaller than 1/min, i.e. whether the wheel is at a halt. If this is not the case, the system can not be switched off. If the driving wheel is at a halt, the system is switched off upon operation of the button.

Figure 3:
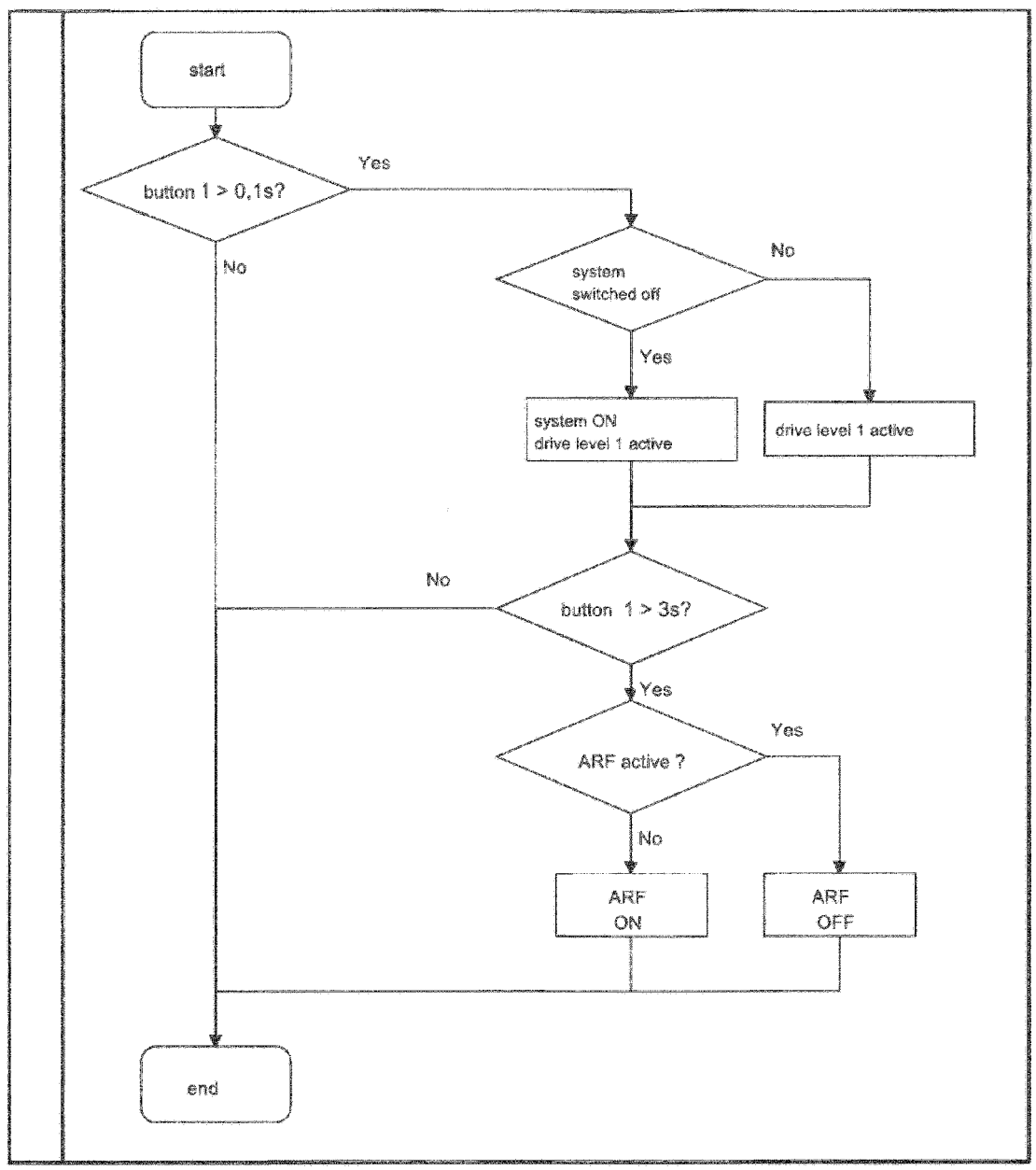
FIG. 3 is a second flow chart of the embodiment according to FIG. 1.
Figure 4:
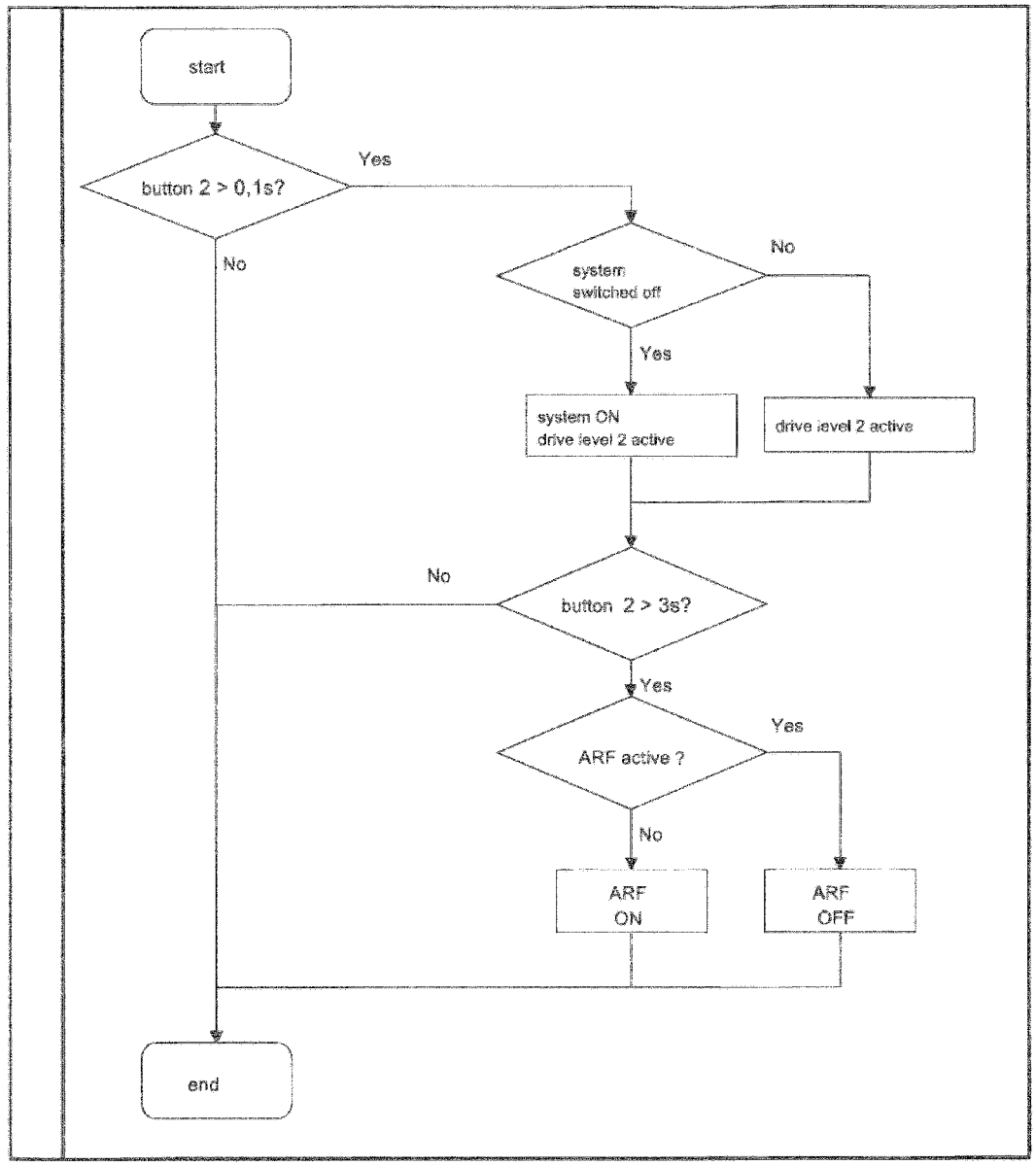
FIG. 4 is a third flow chart of the embodiment according to FIG. 1.

Switching on of the system as well as of the specific anti-rollback-function is further illustrated in connection with FIGS. 3 and 4. FIG. 3 relates to a button 1 which is a switch-on button serving to select a first drive assistance degree. FIG. 4 refers to button 2, which is a button via which a second drive assistance degree can be selected. It is understood that a person skilled in the art can also include a greater number of. It is also understood that the drive assistance degrees can be adjustable or programmable.

If one of said two switch-on buttons, namely button 1 in FIG. 3 and button 2 in FIG. 4, is pushed for longer than 0.1 seconds, a first query is effected whether the system is switched off. If this is the case, the system is activated with the respective drive level. If the system is switched on, the drive level corresponding to the respective button is activated. Both switch-on buttons (button 1 and button 2) therefore can not only be used for activating the system in case it had been switched off but also for switching from drive level 1 to drive level 2 and from drive level 2 to drive level 1, respectively.

Next, a query is effected whether the respective button is pushed for longer than three seconds is performed. If this is not the case, the system remains activated in the respective drive level. The control unit then operates in the regular operational mode using a torque control.

If the respective switch-on button (button 1 or button 2) is pushed for longer than three seconds, an anti-rollback-function which is already activated is disabled and a disabled anti-rollback-function is activated. The switch-on buttons (button 1 and button 2) therefore can be used for switching on the anti-rollback-function as well as for switching it off.

The mode of operation of the anti-rollback-function is explained in the following in connection with the flow chart according to FIG. 5. The corresponding program sequence is repeated in a cyclic manner. At first, a query takes place whether the anti-rollback-function is activated. If this is the case, it is determined whether a force is induced into the hand rim, wherein not only the force as such is determined but also the direction of the force. Corresponding to this direction the right-hand part of the flow chart is processed if this direction is defined as positive, if the direction is defined as negative, i.e. the counter direction of the first direction, the left-hand part of the flow chart is processed. If no force is detected, the value of the timer switch (ARF-timer) is checked. If this is not larger than zero seconds, the torque M_wheel provided by the drive motor is reduced to 0 linearly with respect to time.

If the value of the timer switch ARF-timer is larger than 0 seconds, a query takes place whether the rotational speed of the wheel (n_wheel) is smaller than zero and at the same time, the flag NR is set to 1, or whether a rotational speed of the wheel (n_wheel) is larger than zero and, at the same time, the flag NL is set to 1. If both conditions are not fulfilled, the cycle is terminated and commences again from the start. If one of both conditions is fulfilled, the rotational speed control is activated and the target value of the wheel frequency n_target is set to zero. The meaning of the before-mentioned queries and of the flags NR and NL will be explained in the following in connection with the left-hand branch and the right-hand branch, respectively, of the flow chart according to FIG. 5.

Figure 5:
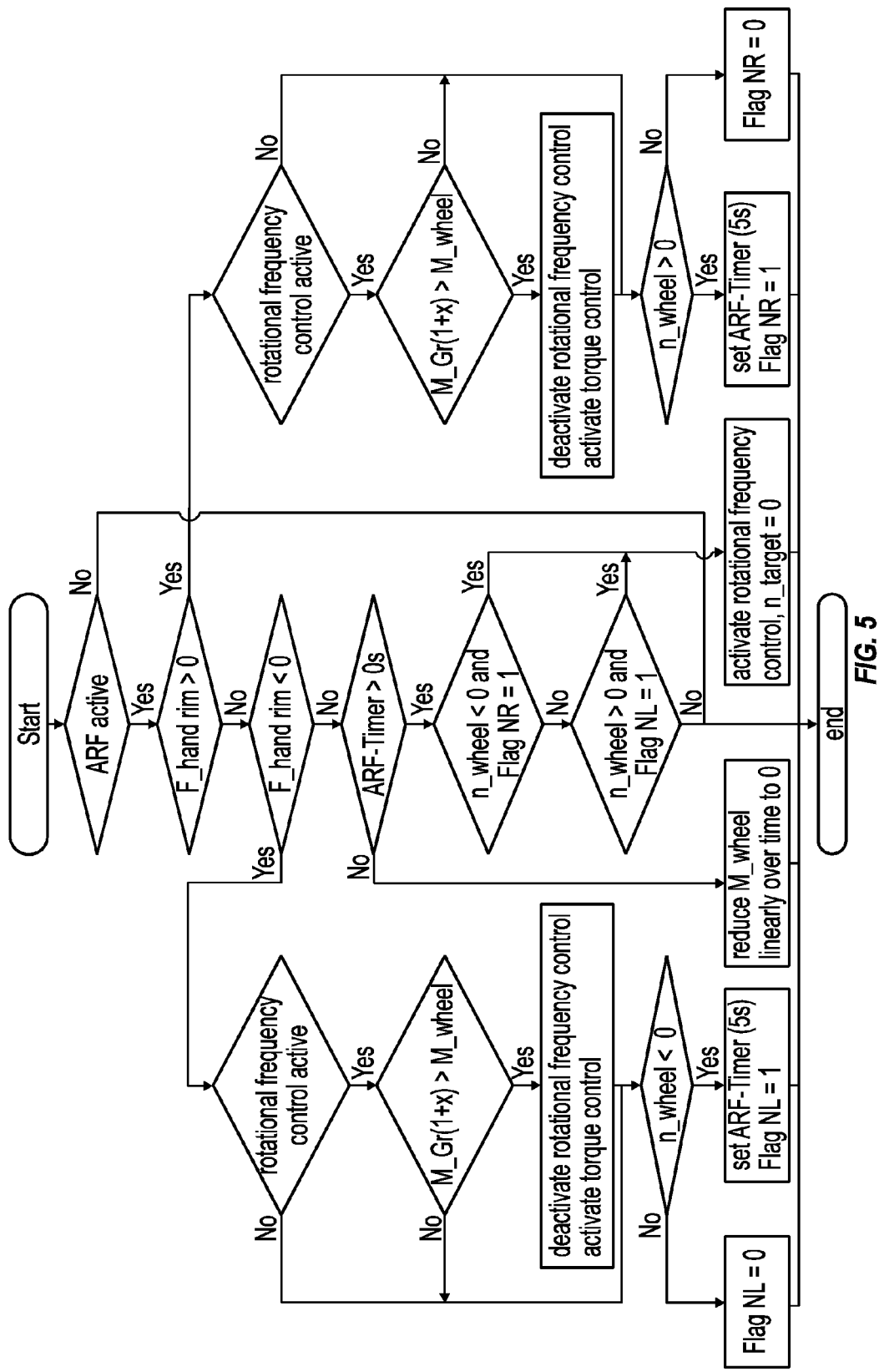
FIG. 5 is a fourth flow chart of the embodiment according to FIG. 1.

The right-hand branch of the flow chart according to FIG. 5 is activated if, when the activated anti-rollback-function is activated, a positive force is manually induced into the hand rim, i.e. a force (F_hand rim) larger than zero is detected. In this case, a further query is effected as to whether the rotational frequency control is active. As explained above, the torque control is generally used in the anti-rollback mode. If the rotational frequency control is not active in case of a positive force, the next query and the operational result therefrom is omitted and a query is effected whether the rotational speed of the wheel (n_wheel) is larger than zero. Values larger than zero in connection with the rotational speed or the rotational frequency of the wheel and in connection with a force manually induced into the hand rim indicates that they have the same direction. If the last mentioned query is answered with yes, i.e. the wheel turns in the same direction, in which a force has been induced into the hand rim, the torque control remains further activated, the value of the timer switch ARF-timer is set to 5 seconds and the flag NR is set to the value 1.

If, however, it is detected in the topmost rhombus of the right branch of the flow chart according to FIG. 5 that the rotational frequency control is active, a query is effected whether the sum of the torques, namely the torque resulting from the drive force manually induced into the driving wheel and the torque provided by the drive motor in accordance with a drive assistance degree depending on the drive force manually induced into the driving wheel, expressed by the parameter M_GR(1+x) is larger than the torque currently provided by the drive motor which is in accordance with the active torque control calculated in accordance with this control.

If the answer is no, the force manually induced by the wheel chair driver and the driving force provided by the drive motors in accordance with the drive assistance degree do not produce a sufficient torque which is larger than the torque which is currently provided by the rotational frequency control. If the rotational frequency control is deactivated, this would result in an unintended reversal of direction. The rotational frequency control therefore remains active in this case and again a query is effected whether there is rotation of the wheel in the first direction, i.e. whether a rotational frequency of the wheel (n_wheel) is larger than zero. If this is not the case, the flag NR is set to 0. If this is the case, the value of the timer switch ARF-timer is set to 5 seconds and the flag NR is set to 1.

If, however, it is detected by the before-mentioned query of the values of the added torques and the current torque of the drive motor according to the rotational frequency control that this hypothetical sum is larger, this means that the wheel would rotate in the desired direction upon activated torque control. In this case, the rotational frequency control is deactivated and the torque control is activated. Afterwards, the query concerning the rotational frequency of the wheel is again effected.

The left branch of the flow chart according to FIG. 5 proceeds in an analogue manner, wherein a negative force and a negative rotational frequency of the driving wheel means that the force and the rotational speed of the driving wheel have the same direction. This could for instance be defined as clockwise or as anti-clockwise.

Accordingly, clockwise rotation, i.e. values of the marker or flag NR larger than zero correspond to the right branch of the flow chart according to FIG. 5 and anti-clockwise rotation, i.e. values smaller than zero of the flag NL correspond to the left branch of the flow chart according to FIG. 5.

In the flow chart according to FIG. 5, the flag NR is set to 1 if there is a positive rotational frequency of the wheel when there is a positive force at the hand rim. Otherwise, the flag NR is set to 0. Correspondingly, the flag NL is set to 1 if there is a negative rotational frequency of the wheel upon a negative force at the hand rim.

The two bottom rhombi in the center branch of the flow chart according to FIG. 5 relate to cases in which no force is induced into the hand rim. By providing the flag, the target direction of the rotation of the wheel in accordance with prior cycles is detected. In the lowermost rhombus of the center branch of the flow chart according to FIG. 5 a query is effected whether the rotational frequency of the wheel is larger than zero and, at the same time, the flag NL has the value 1, which would mean, that upon a negative force a negative rotational frequency of the wheel is provided. In this case, the target direction of the rotational frequency and the actual direction would not coincide. Accordingly, if the answer to this query is to the positive, the rotational frequency control is activated.

What is claimed is:

1. Drive assistance device for a wheel chair, comprising a drive motor,
a driving wheel,
a sensor means which is adapted to detect a drive force manually induced into said driving wheel, and
a control unit which is adapted to control said drive motor for driving a driving wheel in accordance with a drive assistance degree depending on the drive force manually induced into the driving wheel, wherein the control unit comprises an anti-rollback operational mode designed to control the drive motor such that an unintended rolling of the driving wheel is avoided.

2. Drive assistance device according to claim 1, wherein the control unit operates in a normal operational mode in which avoiding of an unintended rolling of the driving wheel is disabled and, alternatively, in said anti-rollback operational mode, in which the drive motor is controlled such that an unintended rolling of the driving wheel is avoided.

3. Drive assistance device according to claim 2, wherein the normal operational mode comprises a torque control which causes the drive motor for driving the driving wheel to be controlled in dependence on a driving force manually induced in said driving wheel.

4. Drive assistance device according to claim 3, wherein the anti-rollback mode comprises a rotational frequency control in which the rotational frequency of the driving wheel is controlled.

5. Drive assistance device according to claim 4, wherein in said anti-rollback operational mode alternatively the torque control or the rotational frequency control is used.

6. Drive assistance device according to claim 5, wherein the control unit is designed such that a change between torque control and rotational frequency control is effected depending on operational parameters.

7. Drive assistance device according to claim 6, characterized in that the operational parameters include one or more parameters of the group comprising: rotational frequency of the driving wheel, rotational direction of the driving wheel, magnitude of the driving force manually induced into the driving wheel, direction of the driving force manually induced into the driving wheel, sum of the torque resulting from the driving force manually induced into the driving wheel, and a torque provided by that driving motor in accordance with a drive assistance degree depending on the driving force manually induced into the driving wheel, the torque currently provided by said driving motor, the value of the timer switch.

8. Drive assistance device according to claim 1, wherein the anti-rollback operational mode can be manually switched on or can be manually switched off or can be manually switched on and off.

9. Drive assistance device according to claim 8, wherein a plurality of drive assistance degree switches is provided serving to preset different drive assistance degrees and wherein the anti-rollback operational mode can be switched on or off or on and off by one or each of said drive assistance degree switches.

10. Drive assistance device according to claim 9, wherein the control unit is in the normal operational mode when switched on.

11. Drive assistance device according to claim 9, wherein the control unit is, when switched on, in the same operational mode in which it had been before it was switched off.

12. Drive assistance device according to claim 1, wherein a force can be manually induced into the driving wheel via a hand rim.

13. Drive assistance device according to claim 1, wherein the drive motor is an electric motor.

14. Drive assistance device according to claim 13, wherein the drive motor and a rechargeable battery and the control unit are housed in the hub of the driving wheel.

15. A wheel chair having the drive assistance device according to claim 1.

* * * * *